Dec. 19, 1922.
B. C. RIBLET.
AUTOMOBILE SIGNAL.
FILED OCT. 18, 1921.
1,439,122.
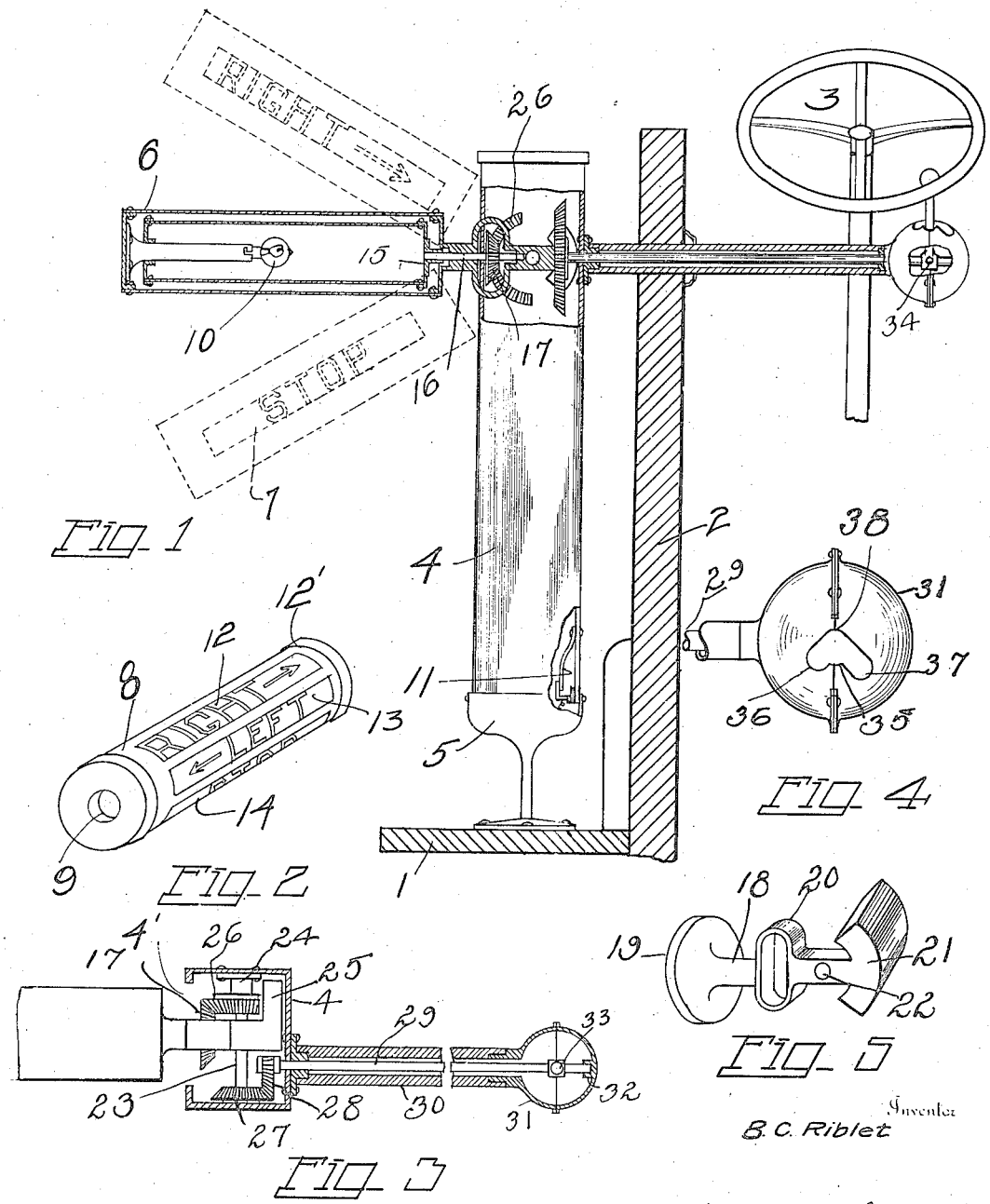

Patented Dec. 19, 1922.

1,439,122

UNITED STATES PATENT OFFICE.

BYRON C. RIBLET, OF SPOKANE, WASHINGTON.

AUTOMOBILE SIGNAL.

Application filed October 18, 1921. Serial No. 508,573.

*To all whom it may concern:*

Be it known that I, BYRON C. RIBLET, a citizen of the United States, residing at Spokane, in Spokane County and State of Washington, have invented certain new and useful Improvements in Automobile Signals, of which the following is a specification.

My present invention relates to improvements in automobile signals especially adapted to indicate motion and direction of travel of vehicles, and is of that type carried by an automobile and adapted to swing in a vertical plane and be simultaneously rotated or revolved. The primary object of the invention is the provision of a signal device which is primarily designed to be swung to any one of three positions in a vertical plane, and involving in its construction a rotatable, illuminated casing which is operated synchronously with the vertical swing of the signal in order that a printed sign may be displayed at night in conjunction with the position signal. To this end the invention consists in certain novel combinations and arrangements of parts whereby the pivoted or swinging signal and its illuminated casing are jointly actuated for displaying signals for both daylight and night use, as will be hereinafter set forth.

In the accompanying drawings I have illustrated one complete example of the physical embodiment of my invention in which the parts are combined and arranged according to the best mode I have thus far devised for the practical application of the principles of my invention.

Figure 1 is a view showing the device of my invention attached to the side of a vehicle body and resting upon the running board, parts of the device being broken away and shown in section for convenience of illustration.

Figure 2 is a perspective view of the rotatable, illumined casing of the signal.

Figure 3 is a horizontal sectional view through the housing and operating shaft support, illustrating the actuating gears and connections.

Figure 4 is an enlarged detail, top plan view of the control head for the signal, the operating lever being omitted.

Figure 5 is a perspective view of the counterweighted pivoted support or bracket for the signal, detached.

In the preferred form of the invention as illustrated in the drawings the device forming the subject matter of my invention is supported as on the left running board 1 of an automobile, in connection with the side 2 of the body of the car, with the operating means for the signal located adjacent to the steering wheel 3 as indicated.

When not in use the signal is enclosed within the vertically disposed housing 4, which is preferably rectangular in cross section, and may be constructed of metal having its outer side provided with an opening 4' extending from its closed top to the bottom pedestal or support 5 which is riveted or bolted to the running board 1.

The vertically swinging signal is supported from the housing and is designed to be swung from pendant position within the housing to any one of the three positions indicated as Right, Left, and Stop, in Figure 1, the first and last positions being indicated in dotted lines and the Left turn position being indicated in full lines.

The signal includes a cylinder 6, preferably of metal, of the required size, and as indicated in dotted lines in Figure 1 this cylinder, at the rear, is fashioned with a window or longitudinally extending slot 7 in order that portions of the enclosed revolvable, illuminated casing 8 may be observed through this opening. The illuminated casing 8 is also cylindrical in shape and of a size to conform to the interior of the enclosing signal arm or cylinder 6, the inner casing being provided with an opening 9 in its outer end to accommodate the electric lamp 10 fixed to the outer cylinder. The lamp projects into the inner casing and is illumined from a suitable circuit which includes the control switch 11 shown in Figure 1 where the housing 4 is broken away to disclose the switch therein. The inner illuminated casing 8 is preferably of opaque material, but is provided with three transparent or stenciled signs indicated at 12, 13, and 14 that are fixed in suitable manner in the wall of the casing, the latter being slotted for the purpose as indicated at 12'.

In addition to the words Right and Left, these respective signals may have arrows as shown pointing in the proper direction, and these signals i. e. Right, Left, and Stop may selectively be brought to position to register with the slot or opening 7 in the outer casing 6 of the signal, as indicated in dotted lines in Figure 1. The display of a selected signal or word is governed by the position of the signal. Thus when the signal is lifted to an upward angle of 45° the Right signal is brought to position for exposure through the window of the outer casing; with the signal in horizontal position the Left signal is displayed, and with the signal at the downward angle of 45° the Stop signal is displayed.

The inner illuminated casing is revolvable within the outer casing, and its head 15 has secured thereto a shaft 16 provided with a fixed pinion 17. The shaft is journaled in a bearing bracket 18 which latter is fashioned with a flanged disk 19 at one end, which disk forms the head of the outer casing 6 at the end opposite to that of the lamp 10. The bearing bracket or sleeve 18 terminates in a yoke 20, and beyond the yoke an arm 21 is provided having a bearing opening 22, by means of which the bracket is journaled on a horizontally extending shaft 23 that is journaled at 24 in the signal housing. Thus, the bracket which extends transversely of the automobile is pivoted, and with it the signal casings, in the housing by means of the shaft 23 that extends longitudinally of the automobile. The bracket is fixed to the shaft 23 and is capable of oscillating in a vertical plane, with the shaft in the housing as a support, and of course the laterally extending shaft 16 swings with the bracket and signal with the shaft 23 as the pivot support, and a counterweight 25 is provided at the free end of the bracket to balance the parts.

The shaft 23 has a segmental or arcuate rack 26 thereon that meshes with the pinion 17, and this shaft also has a bevel pinion 27 that is engaged by a second arcuate rack 28 on the actuating shaft 29. The shaft 29 is supported within a tubular arm 30 attached to the inner side of the housing 4 and projects through the inner wall of the housing with the arcuate rack 27 inside the housing. The tubular arm or support for the shaft 29 terminates in a hollow, spherical head 32 located adjacent to the steering wheel 3 of the automobile, and within this head an operating lever 33 is connected to the shaft 29 by means of a forked, pivoted joint 34. By this joint the lever is permitted to have swinging movement parallel with the longitudinal axis of its shaft 29, and by moving the lever in a plane transverse to the longitudinal axis of its shaft, the latter may be revolved or oscillated. To accommodate this movement of the lever 33 the spherical hollow head is provided with an opening and this opening is fashioned with three notches 35, 36, and 37, as best seen in Figure 4, where the lever is omitted, but it will be apparent that the lever projects through the opening in the head and may be manipulated from outside the head.

When the signal is not in use and is enclosed within its housing, the lever is positioned at the forward end or notch 38 of the opening in the head 31, and to actuate the signal the lever is pulled back to one of three notches 35, 36, 37 that are located at different distances from the neutral notch 38. Thus the shortest stroke of the lever to notch 35 will result in swinging the signal to first or Stop position; a longer stroke of the lever swings the signal to horizontal or Left position with the lever in notch 36, and the longest stroke of the lever to notch 37 results in swinging the signal to uplifted position to display the Right turn signal. The pivotal connection 34 permits freedom of movement of the lever to swing to the right or left sides of its point of connection with the shaft 29, and of course the shaft may be rocked or oscillated in any one of the three positions of the lever with relation to its shaft 29. As the lever is pulled, the shaft 29 is turned and with it the attached arcuate rack 28, the movement of the rack being anticlockwise. The rack movement is transmitted to the shaft 23 through the bevel pinion 27 thereon resulting in a clockwise movement of the pinion 23 which, through the shaft 23 causes the signal to swing outwardly and upwardly from the housing. The rotary movement of the shaft 23 and its arcuate rack 26 also imparts a rotary movement to the pinion 17 and through this pinion the shaft 16 and illuminated, inner casing is revolved to bring a signal, in this instance the word Stop to the first position in order that the word may be visible through the opening 7 in the outer casing of the signal. It will readily be apparent that continued movement of the lever, as to the notch 36 will display the Left signal, and a prolonged movement of the lever will display the Right signal, the movement of the swinging signal and rotary movement of the inner, illuminated casing being synchronous for displaying the signal corresponding with the position of signal device.

The counterweight 25 is designed to slightly overbalance the weight of the signal device and hold the device extended in the desired position, and when the signal device is located within the housing the counterweight is designed to maintain the equilibrium of the device and retain the device in obscurity, and the lever is disposed in its notch 38.

By the utilization of the device of the above described invention, it will be apparent that the direction of travel of an automobile, and the motion of the automobile may with facility be signaled or indicated to a following automobile for safety in traffic conditions, and that the device of the invention is comparatively simple in construction and operation, and well calculated to perform its functions with efficiency and reliability.

Having thus fully described my invention, what I claim as new and desire to secure by Letters Patent is:—

1. The combination with an enclosing housing of a bracket pivoted therein and an outer signaling casing fixed to said bracket, an inner indicating casing revolvable within the outer casing and having a shaft supported in said bracket, an operating shaft journaled in the housing, a transverse shaft in the housing forming a pivotal support for said bracket, and gear connections between said three shafts for swinging the two casings and synchronously revolving the inner casing.

2. The combination with an enclosing housing, of a bracket pivoted therein and an outer signaling casing fixed to said housing, an inner revolvable casing having a shaft supported in said bracket, a yoke formed integral with the bracket and a counterweight at the free end of the bracket, a gear wheel on said shaft located within said yoke, an operating shaft journaled in the housing and a gear thereon, a transverse shaft forming a pivotal support for said bracket, and gear connections on the transverse shaft between said operating shaft and the first mentioned shaft.

In testimony whereof I affix my signature.

BYRON C. RIBLET.